United States Patent
Murano et al.

[11] Patent Number: 5,934,411
[45] Date of Patent: Aug. 10, 1999

[54] CHECKER-ARM CHAIN LUBRICATING APPARATUS

[75] Inventors: Tetsuya Murano, Katano; Mamoru Tagawa, Kita-gun; Kenzo Saito, Kagawa-gun, all of Japan

[73] Assignees: Tsubakimoto Chain Co., Osaka, Japan; Futec Origin Corp., Kagawa-ken, Japan

[21] Appl. No.: 08/923,253

[22] Filed: Sep. 4, 1997

[30] Foreign Application Priority Data

Mar. 18, 1997 [JP] Japan .................................. 9-064990

[51] Int. Cl.⁶ ........................................................ F01M 1/00
[52] U.S. Cl. ........................ 184/11.5; 184/15.1; 184/15.2; 184/44
[58] Field of Search .................. 184/11.5, 15.1, 184/15.2, 30, 44

[56] References Cited

U.S. PATENT DOCUMENTS

| | | | |
|---|---|---|---|
| 3,503,470 | 3/1970 | Lister | 184/55 |
| 3,869,023 | 3/1975 | Thomson et al. | 184/15 A |
| 4,009,764 | 3/1977 | Hafner | 184/15 A |
| 5,647,456 | 7/1997 | Gelb | 184/15.2 |

FOREIGN PATENT DOCUMENTS

52-49030  11/1977  Japan .
60-45088  10/1985  Japan .

Primary Examiner—John A. Jeffery
Assistant Examiner—David Fenstermacher
Attorney, Agent, or Firm—Armstrong, Westerman, Hattori, McLeland & Naughton

[57] ABSTRACT

A checker-arm chain lubricating apparatus is provided that efficiently and surely performs lubrication on a small-size chain and a chain traveling at high speeds. When a checker arm, oscillated by a chain, is returned by the force of a return spring, a cam face of a plunger activating cam fixed to a cam shaft together with the checker-arm operates a plunger of a pump unit via a cam follower to jet lubricant from a lubricating nozzle to the chain. The above-mentioned cam face is formed at a position radially deviated from the center of the cam shaft and the normal direction of the cam face is at generally right angles to the axis of the cam shaft. Consequently, the plunger can be rapidly operated by a small oscillation angle of the checker arm and efficient lubrication in synchronization with chain travel can be performed by a small amount of lubricant jetted from the lubricating nozzle at high speeds.

6 Claims, 8 Drawing Sheets

DIRECTION OF CHAIN TRAVEL

DIRECTION OF
REVERSE CHAIN TRAVEL

DIRECTION OF CHAIN TRAVEL

CHECKER-ARM CHAIN LUBRICATING APPARATUS

BACKGROUND OF THE INVENTION

1. Field of the Invention

The present invention generally relates to a lubricating apparatus for automatically lubricating a chain by being driven thereby and, more particularly, to a checker-arm chain lubricating apparatus suitable for a small-size chain and a high-speed chain having a construction in which a lubricating pump is operated by a checker arm oscillated by the operation of the chain.

2. Description of the Related Art

An apparatus is known as a connveyor chain lubricating apparatus, in which motion of a checker arm oscillated by a traveling chain is transmitted to a plunger of a reciprocating pump unit through a cam for automatic lubrication of the chain.

Figure 9:
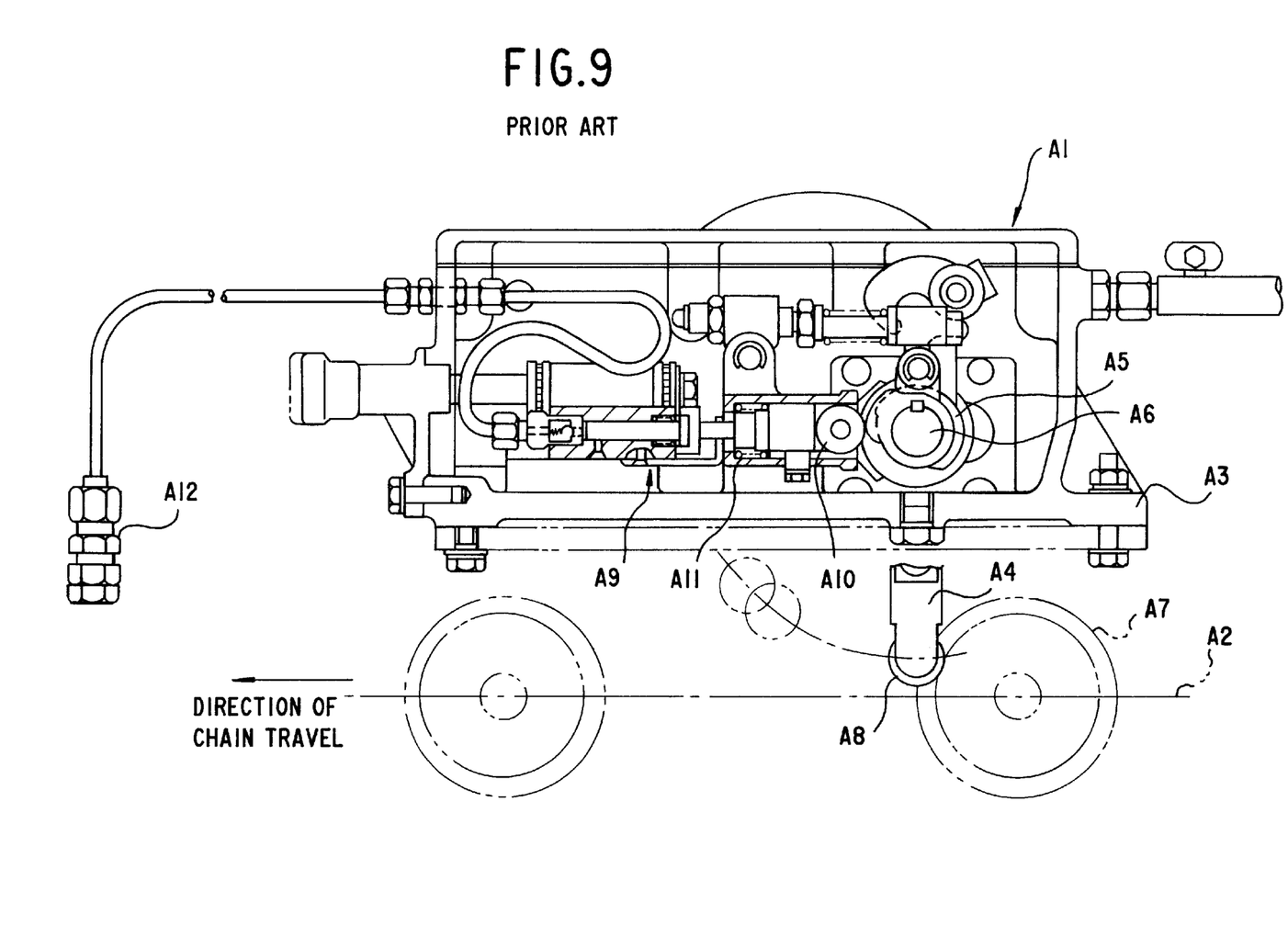
FIG. 9 is a cross section illustrating a general construction of a prior-art checker-arm chain lubricating apparatus.

FIG. 9 shows an example of a conventional chain lubricating apparatus as mentioned above. A lubricating apparatus A1 has a frame A3 fixed at a predetermined position in the vicinity of a travel path of a conveyor chain A2. A checker arm A4 and a cam shaft A6 fixed with a cam A5 are swingably supported on the frame A3.

The checker arm A4 is rotatively arranged at the tip end thereof with a checker roller A8 that abuts against a roller A7 of the chain A2.

The checker arm A4 is arranged such that the roller A7 pushes the checker roller A8 as the chain A2 moves to oscillate forward, thereby allowing the roller A7 to pass. Restoration torque is given by a return spring, not shown, installed on the cam shaft A6 such that, when the checker roller detaches from the roller A7, the checker arm returns again to the position indicated in the above-mentioned figure.

On the other hand, a roller follower A10 linked with a plunger of a reciprocating pump unit A9 is pressed by a spring A11 against a cam face formed around the cam A5. When the checker arm A4 is oscillated forward by the chain A2, a lubricant is taken into the pump unit A9 from a lubricant tank (not shown) which is linked to the inlet port of the pump unit A9 and the lubricant is discharged from the tip of a lubricant nozzle A12 which is linked to the discharge port of the pump unit A9 toward the chain A2 when the checker arm moves to return.

The lubricating apparatus using the conventional checker arm having the above-mentioned construction has been developed for lubricating conveyor chains that are relatively large in size and slow in operating speed. In this lubricating apparatus, the roller follower linked to the plunger of the pump unit is made to follow the profile of the circumferential face of the cam, so that the oscillation angle of the checker arm becomes as large as about 38 degrees, thereby making it hard to operate the plunger at high speeds. This drawback makes a lubricating apparatus of this type unsuitable for a small-size chain having a small pitch between rollers and bushings or for a chain operated at high speeds.

If the chain travels in a reverse direction, the checker arm must be prevented from interfering with the roller of the chain. For this purpose, the lubricating apparatus is required to have an additional mechanism by which a clutch is installed between cam and cam shaft and the checker arm is rotated to a retired position by rotating an operator knob arranged on the cam shaft and a stopper mechanism by which the checker arm is held at the retired position. This increases the number of parts used in the apparatus, making the construction complicated and thus, increasing the manufacturing cost.

In addition, use of the above-mentioned conventional apparatus for a chain that travels in a vertical direction requires the lubricating apparatus to be installed vertically. Such orientation, however, requires that the direction in which the apparatus is bled be taken into account because the movable parts in the lubricating apparatus are generally lubricated by an oil bus. This consequently requires a bleeder pipe to be re-installed.

It is therefore an object of the present invention to provide a checker-arm chain lubricating apparatus that is capable of efficiently and surely lubricating both a small-size chain and a chain operating at high speeds, that is simple in construction, that is low in manufacturing cost, and that can be easily adapted to the chain installed direction.

SUMMARY OF THE INVENTION

In carrying out the invention and according to one aspect thereof, a checker-arm chain lubricating apparatus is provided which includes: a main body case fixedly placed in a vicinity of a travel path of a chain; a cam shaft swingably supported on the main body case, wherein the cam shaft has an axis intersecting a direction in which the chain travels, the cam shaft having a protruding portion protruding outside the main body case; a checker arm fixed at a base end thereof on the protruding portion, wherein a tip end of the checker arm is engaged with the chain as the chain travels so that the checker arm is oscillated from an engagement start position to a disengagement position; a return spring for returning the checker arm to the engagement start position when the tip end of the checker arm is disengaged from the chain at the disengagement position; a plunger activating cam fixed to the cam shaft, wherein the plunger activating cam is formed at a position eccentric from a center of the cam shaft toward a radial outside thereof, and the plunger activating cam has a planar cam face which normally is at substantially right angles to the axis of the cam shaft; a cam follower slidably supported on the main body case in a direction at substantially right angles to the axis of the cam shaft and abutted against the cam face; a pump unit arranged on the main body case and having a plunger sliding integrally with the cam follower in order to discharge a lubricant toward the chain from a lubricating nozzle communicating with a discharge port when the plunger moves forward and to take in the lubricant from an oil tank communicating with an intake port when the plunger moves backward; and wherein, when the checker arm is oscillated in one direction by the chain, the cam follower moves backwardly as the cam face of the plunger activating cam moves and when the checker arm returns from the one direction in which it was oscillated, the cam face pushes the cam follower to move the plunger forward.

Preferably, the checker-arm is composed of an arm main body fixed to the cam shaft and a ducking arm swingably supported at a base end thereof on a tip end of the arm main body and having a checker roller at a tip end of the ducking arm, the checker roller being engaged with the chain, the ducking arm being swingable only in a direction opposite the direction the chain normally travels from an extended position in a direction extending to the tip end of the arm main body and, simultaneously, being held at the extended position by a force of a spring to oscillate against the force of the spring when the chain travels in a direction opposite to the direction the chain normally travels to clear an engagement between the chain and the checker roller.

Preferably, a cam shaft hole is formed in the base end of the checker-arm for allowing the cam shaft to be inserted through the same shaft hole and an index pin having tip end which can go in and out of the cam shaft hole and which can be operated from outside the checker arm and a spring for forcing the index pin in a protruding direction, the cam shaft being formed on a circumferential surface thereof with a plurality of index holes in which the tip end of each index pin of the plurality of the index pins is selectively inserted for positioningly fixing the checker-arm.

Preferably, the plurality of index holes are formed on the cam shaft along any of a radial direction thereof and an axial direction thereof.

When the checker arm is oscillatingly engaged with a bushing or a roller of the traveling chain, the cam face of the plunger activating cam, which is fixed to the cam shaft together with the checker arm, recedes and then the cam follower moves by following the movement of the cam face along with the plunger of the pump unit. In this operation, the plunger moves in the direction in which the lubricant is taken into the pump unit, thereby supplying the lubricant stored in the lubricant tank, which communicates with the inlet port of the pump unit, into the pump unit.

When the chain travels further to disengage the checker arm from the chain, the checker arm quickly returns to its original position by the returning force of the return spring. At the same time, the cam face of the plunger activating cam pushes the cam follower, and then the plunger is moved through the cam follower in the lubricant discharge direction.

Consequently, the lubricant is discharged from the discharge port of the pump unit into the lubricating nozzle through which the lubricant is jetted to the chain at a high speed.

If the checker arm is composed of the arm main body fixed on the cam shaft and the ducking arm swingably supported at the base end thereof on the tip end of the arm main body and having a checker roller at the tip end of the ducking arm, the checker roller being adapted to engage with the chain, the arm main body and the ducking arm oscillate in an integrated manner around the cam shaft to perform the above-mentioned lubricating operation when the chain moves in the normal travel direction.

On the other hand, when the chain travels in the reverse direction, if the checker roller is pushed by the bushing or roller of the chain, the ducking arm swings around the base end portion thereof, allowing the chain to travel in the reverse direction.

Further, if the cam shaft is inserted in the cam shaft hole formed at the base end side of the checker arm, and the tip of the index pin, arranged on the checker arm, is inserted selectively in one of the index holes formed at a plurality of positions on the circumference of the cam shaft to fix the checker arm to the cam shaft, only inserting the index pin can easily fix the checker arm to the cam shaft or easily change checker arm positions as required.

If the index holes are formed at a plurality of positions along the circumferential direction of the cam shaft, lubrication of any chains that travel at a variety of angles with the mounting attitude of the lubricating apparatus kept horizontal can be accomplished. If the index holes are formed at a plurality of positions along the axial direction of the cam shaft, selecting one of the index holes into which the index pin can be inserted, may optimize the engagement position of the checker arm in the width direction of the chain corresponding to the size of the chain to fix the checker arm to the cam shaft.

DETAILED DESCRIPTION OF THE INVENTION

Figure 1:
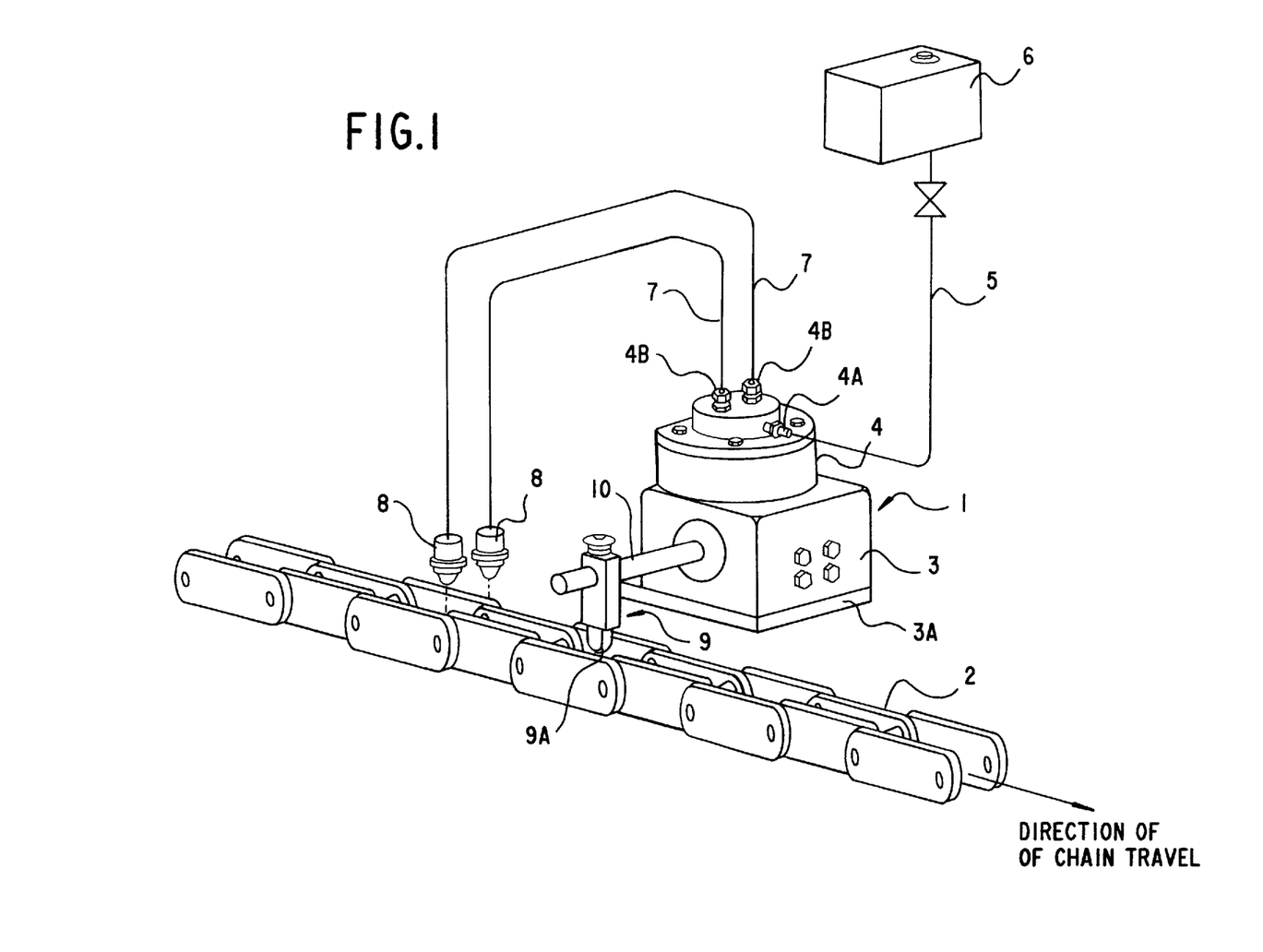
FIG. 1 is a perspective view illustrating a first preferred embodiment of a checker-arm chain lubricating apparatus of the present invention.
Figure 2:
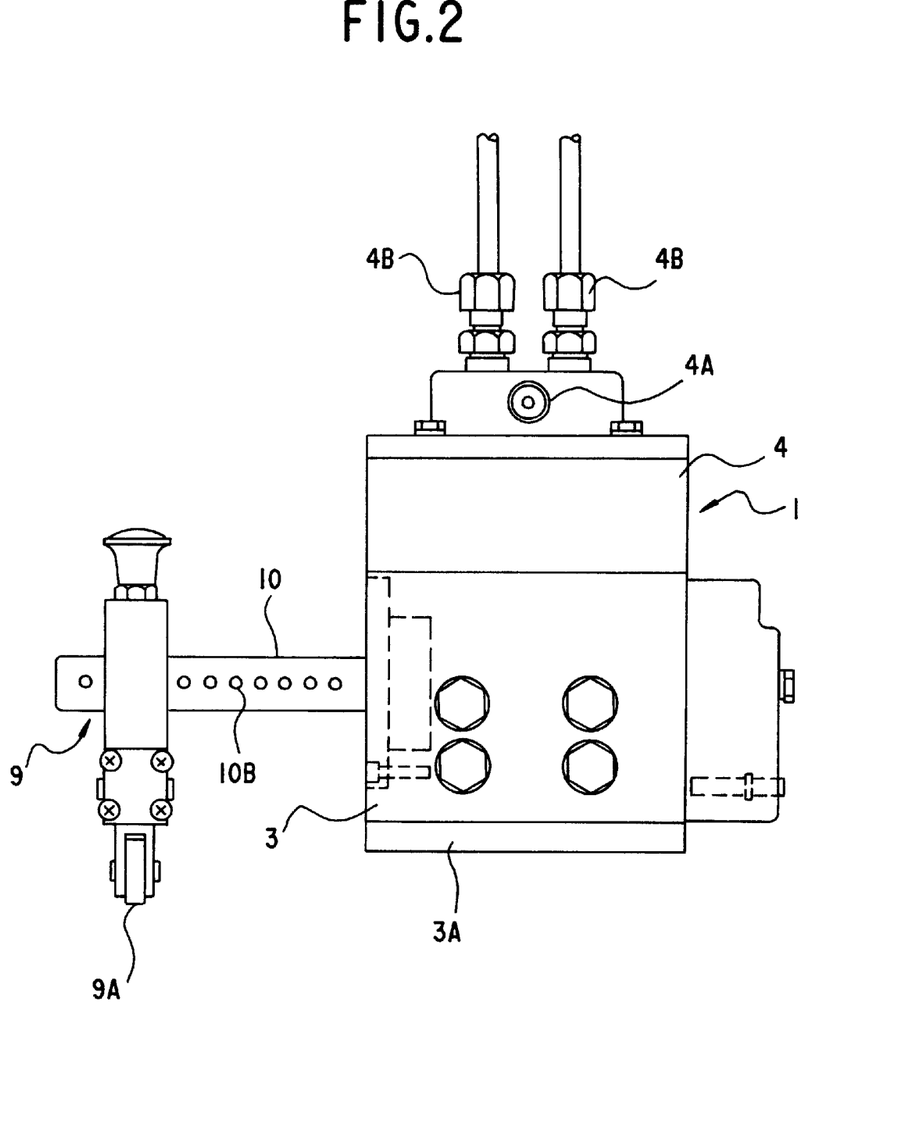
FIG. 2 is a right-side view of the first embodiment of the present invention.
Figure 3:
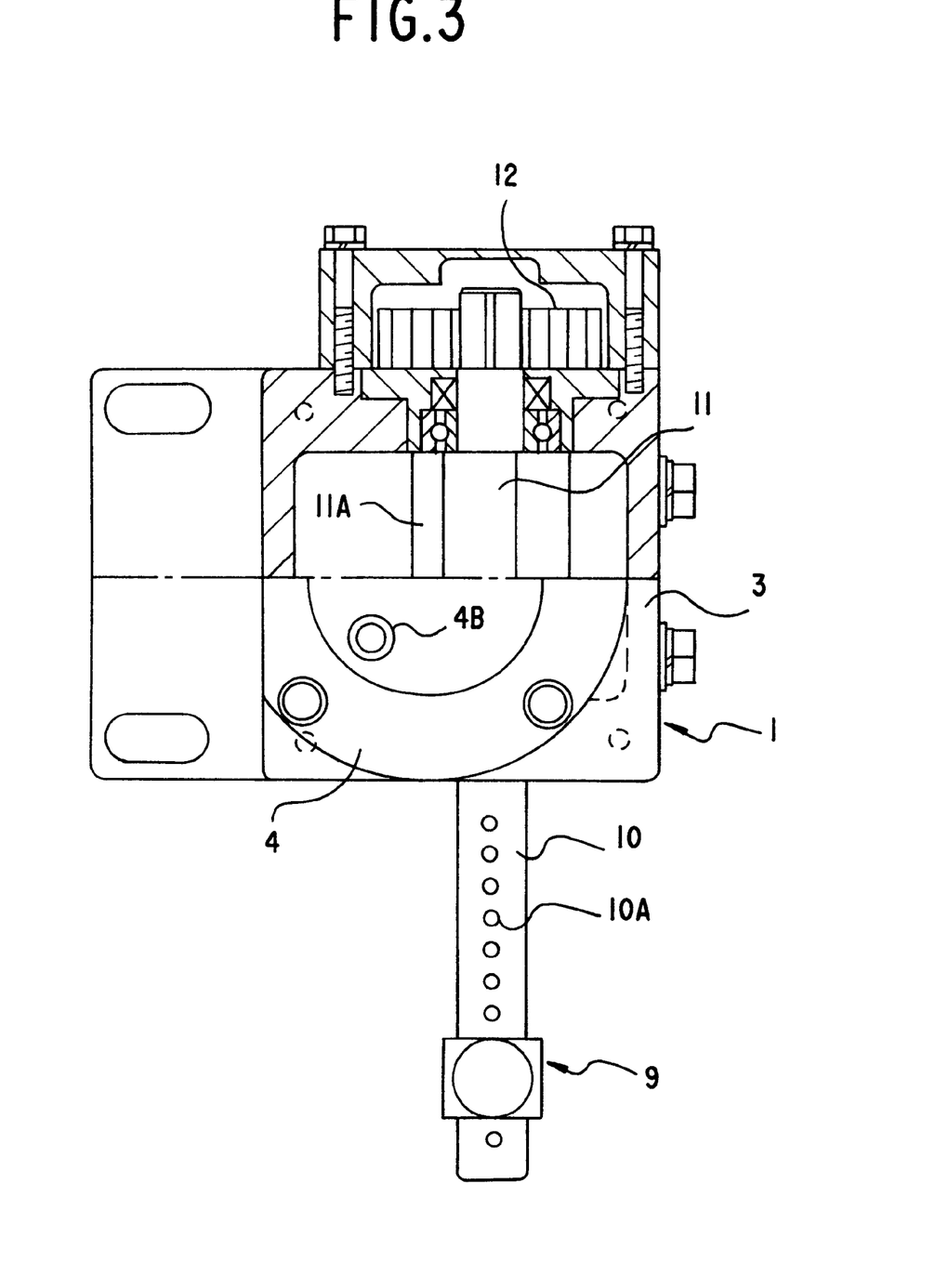
FIG. 3 is a top view illustrating a cross section of a partially cut away section of the first embodiment of the present invention.

This invention will be described in further detail by way of example with reference to the accompanying drawings. FIG. 1 is a perspective view illustrating a checker-arm chain lubricating apparatus practiced as one preferred embodiment of the present invention. FIG. 2 is a right-side view of this embodiment. FIG. 3 is a top view illustrating a cross section of a partially cut away section of this embodiment.

Referring to FIG. 1, a lubricating apparatus 1 is installed at a fixed position on the side of a travel path of a chain 2. A base 3A, arranged under the main body case 3, is bolted to a mounting section (not shown) in the vicinity of the travel path of the chain 2.

At an upper portion of the main body case 3, a pump unit 4 is arranged. An inlet port 4A thereof is linked through an inlet pipe 5 to an lubricant tank 6 in which lubricant is stored.

Two discharge ports 4B, arranged on the pump unit 4, are linked through two discharge pipes 7, respectively, to a pair of lubricating nozzles 8 arranged at the right and left sides above the chain 2.

A checker arm 9 for driving the pump unit 4 by movement of the chain 2 is fixed to a cam shaft 10 that protrudes outside the main body case 3 of the lubricating apparatus 1.

Figure 4:
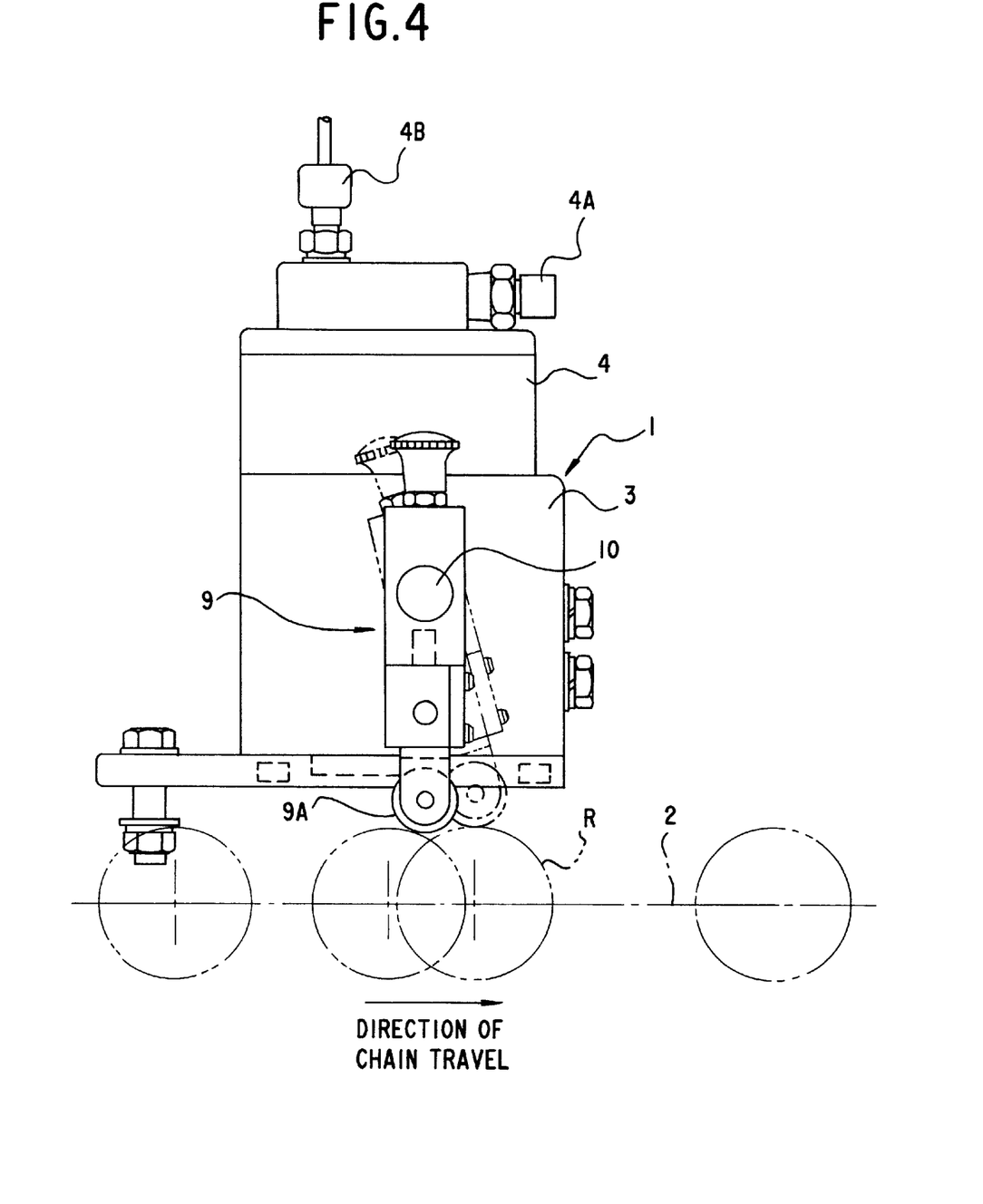
FIG. 4 is an elevation view illustrating the checker-arm chain lubricating apparatus according to the present invention in operation.

A checker roller 9A is rotatively arranged at the tip of the checker arm 9. The checker roller 9A is engaged with a roller R of the chain 2 traveling as shown in FIG. 4 and oscillates to swivel the cam shaft 10.

Figure 5:
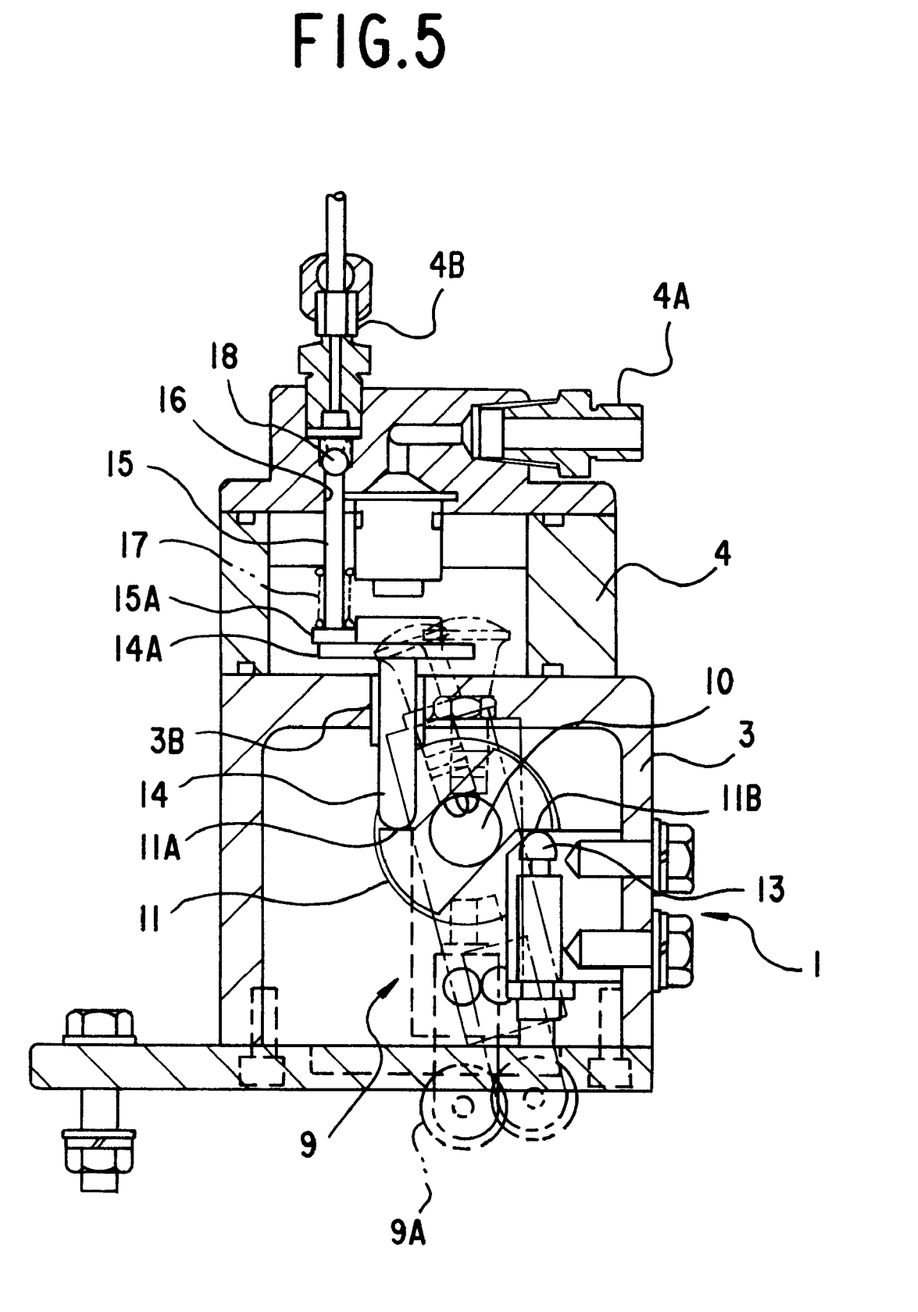
FIG. 5 is a cross section illustrating an internal construction of the lubricating apparatus.

FIG. 5 is a cross section illustrating an internal construction of the lubricating apparatus 1. Inside the main body case 3, a plunger activating cam 11 is fixed to the cam shaft 10. A flat cam face 11A, which is normally approximately at right angles to the axis of the cam shaft 10, is formed on the plunger activating cam 11 at a position radially deviated outwardly from the center of the cam shaft 10.

It should be noted that the cam face 11A is generally horizontal when the checker arm 9 is facing down as shown in FIG. 1. A stopper face 11B, facing down, is formed on the plunger activating cam 11 at a position opposite to the cam face 11A relative to the cam shaft 10.

Referring to FIG. 3, at the rear end of the cam shaft 10, a spiral return spring 12 is attached. By this return spring 12, the cam shaft 10 is given a clockwise torque as shown in FIG. 5 so that the stopper face 11B always abuts against the top end of a stopper 13.

The lower end of a cam follower 14, axially and slidably inserted in a guide hole 3B formed in the up/down direction of the main body case 3, is abutted against the stopper face 11A of the plunger activating cam 11.

A plunger abutting section 14A is arranged on the cam follower 14 at the upper end thereof. The lower end of the plunger 15 of the pump unit 4 is abutted against the upper face of the plunger abutting section 14A. The plunger 15 is slidably vertically inserted in a cylinder hole 16 in an oil-sealed manner.

Further, the plunger 15 is forced down by a compression spring 17 loaded between a collar-shaped spring receiving section 15A formed at the lower end of and around the plunger 15 and the lower end face of the cylinder 16. Through the plunger 15, the lower end of the cam follower 14 is pressed against the cam face 11A of the plunger activating cam 11.

The push-down force applied to the cam face 11A from the lower end of the plunger activating cam 11 causes an counterclockwise torque, shown in FIG. 5, to act on the cam shaft 10. However, since the above-mentioned torque by the return spring 12 is set at a level greater than that of the counterclockwise torque, the stopper face 11B is in a state in which the stopper face 11B is abutted against the upper face of the stopper 13, when no external force is applied to the checker arm 9.

On the other hand, the inside of the cylinder 16 is communicating with the discharge port 4B through a ball check valve 18 that passes lubricant only in the direction from the cylinder 16 to the discharge pipe 7. It should be noted that, although not shown, there are two discharge ports 4B. For the construction of the other discharge port 4B, the same ball check valve, the same cylinder, and the same plunger as those mentioned above are provided.

Although not shown in detail, the inlet port 4A is in communication through a filter for filtering foreign matter from lubricant provided between the ball check valve 18 in the cylinder 16 and the upper end face of the plunger 15 and through the ball check valve that passes lubricant only in the direction of the cylinder 16.

With the lubricating apparatus 1 constituted as described above and installed as shown in FIG. 1, when the chain 2 is run, the checker roller 9A arranged on the tip of the checker arm 9 engages with the roller R of the chain as shown in FIG. 4, thereby oscillating the checker arm 9 against the force of the return spring 12 of FIG. 3 counterclockwise to a position indicated by an imaginary line (see FIG. 4).

Consequently, the plunger activating cam 11 shown in FIG. 5 swivels counterclockwise along with the cam shaft 10, moving the cam face 11A downwardly, which lowers the plunger 15 and the cam follower 14 forced down by the compression spring 17.

When the plunger 15 is lowered, lubricant flows from the lubricant tank 6 of FIG. 1 into the cylinder 16 through the inlet port 4A. It should be noted that the lubricant tank 6 is installed at a higher level than the pump unit 4 in order to allow lubricant to be supplied by gravity into the inlet port 4A through the input pipe 5.

Then, when the roller R of the chain 2 disengages from the checker roller 9A at the lower end of the checker arm 9 oscillated as indicated by the imaginary line of FIG. 4, the checker arm 9 oscillates clockwise by the force of the return spring 12 to return to the original position indicated by the solid line.

At this moment, the clockwise rotation of the plunger activating cam 11 may cause the cam face 11A to push up the cam follower 14 quickly, thereby pushing up the plunger 15 via the cam follower 14.

Figure 8:
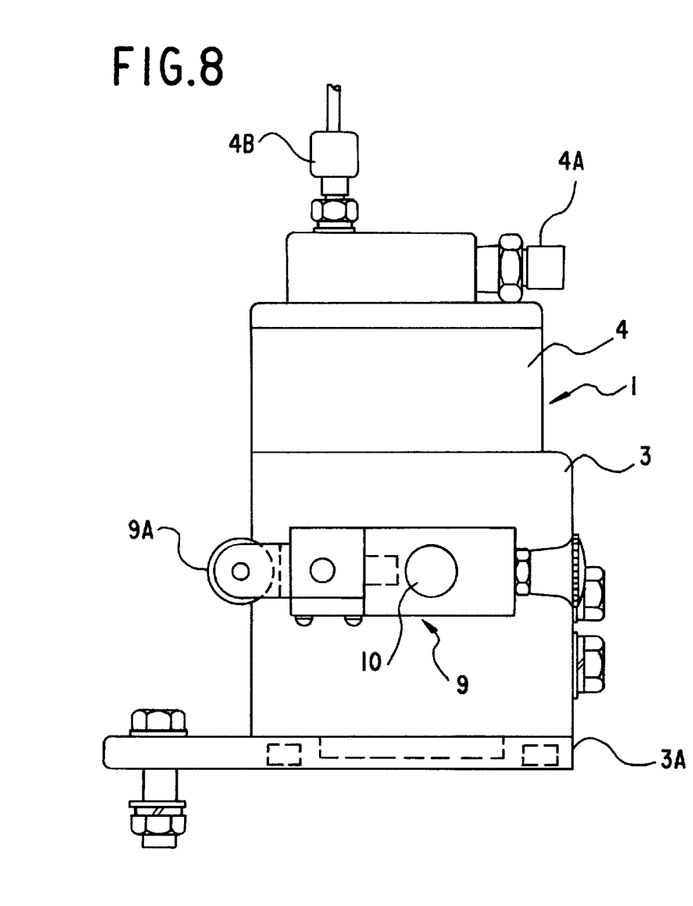
FIG. 8 is an elevation view illustrating the laterally oriented checker arm of the checker-arm chain lubricating apparatus according to the present invention.

As a result, the lubricant filled between the ball check valve 18 in the cylinder and the upper end face of the plunger 15 is discharged to the discharge pipe 7 from the ball check valve 18 to be jetted to the chain 2 from the lubricating nozzle 8 shown in FIG. 8 at a high speed.

Then, when the checker arm 9 has returned to its original position, the checker roller 9A engages with a following roller R, repeating the above-mentioned operation. It should be noted that, in the present embodiment, an amount of lubricant to be jetted to the chain 2 from the lubricating nozzle 8 at a time is as small as about 0.05 cc.

Figure 6:
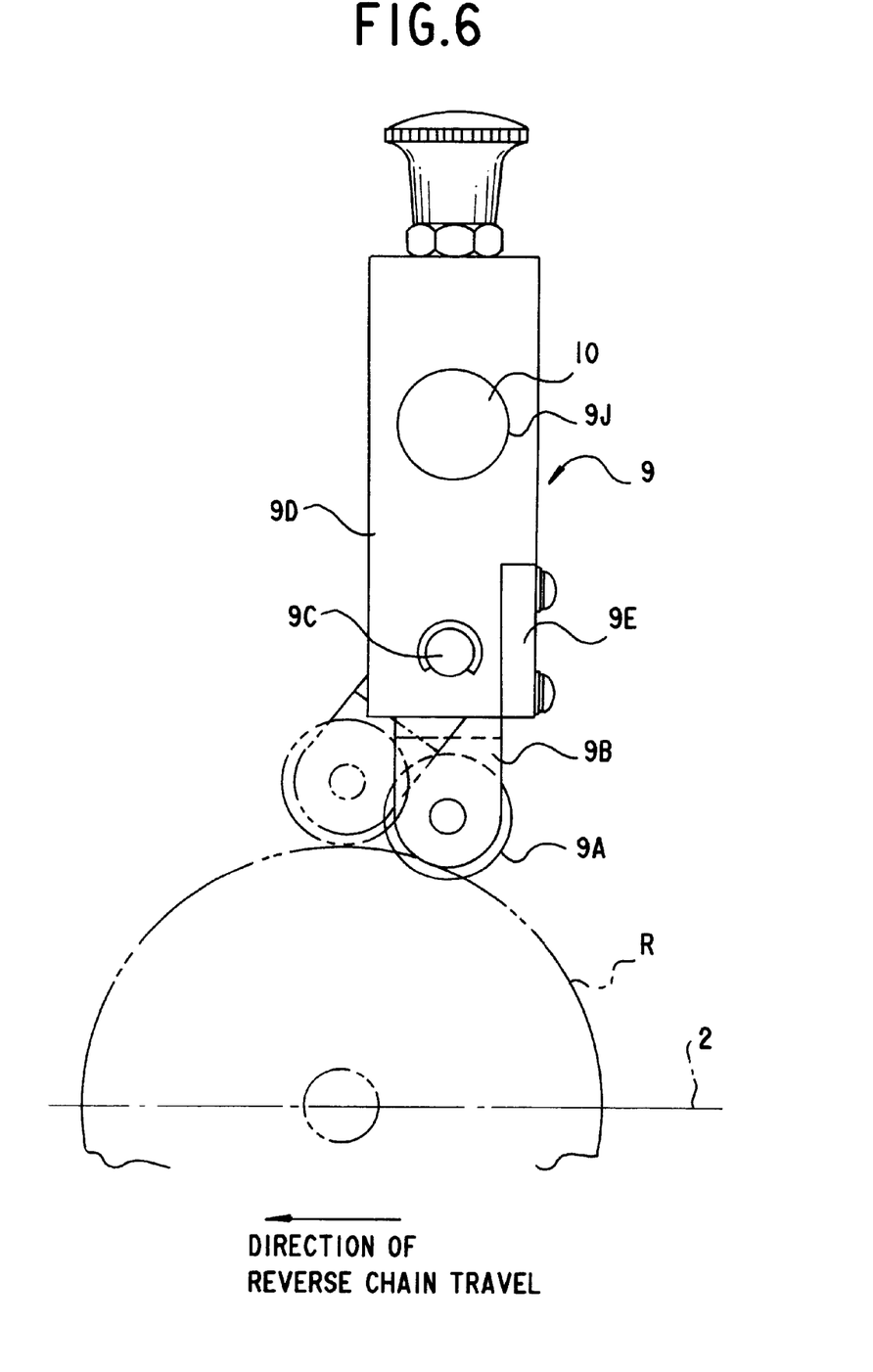
FIG. 6 is a side view illustrating the checker arm.
Figure 7:
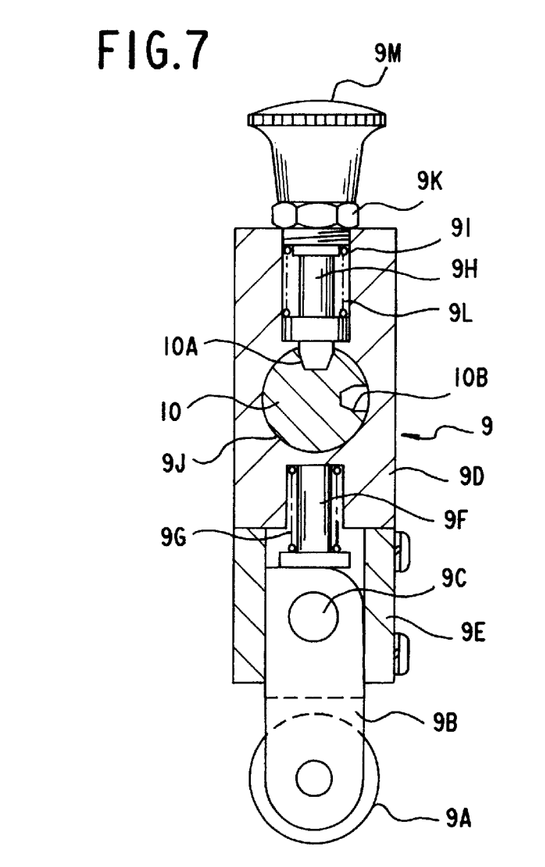
FIG. 7 is a cross section illustrating an internal construction of the checker arm.

FIG. 6 is a side view illustrating the checker arm 9, FIG. 7 is a cross section illustrating an internal construction of the checker arm. The checker arm 9 is composed of a ducking arm 9B and an arm main body 9D in which the base end of the ducking arm 9B is swingably linked to the tip end via a pivot pin 9C.

The ducking arm 9B can oscillate from a position extended from the tip end of the arm main body 9D indicated by solid line shown in FIG. 6 to the direction reverse to the normal travel direction of the chain 2 indicated by an imaginary line shown in the same figure around the pivot pin 9C. The swinging movement from the extended position forward is blocked by a movement blocking plate 9E that abuts the front end face of the ducking arm 9B at the extended position.

Against the upper face of the base end of the ducking arm 9B, the lower face of a spring plunger 9F is pressed by a compression spring 9G to hold the ducking arm at the extended position. When the chain 2 is traveling in the normal travel direction, the ducking arm 9 oscillates around the cam shaft 10 integrally with the arm main body 9D as shown in FIG. 4.

On the other hand, when the chain 2 travels in the reserve direction, the arm main body 9D is prevented from oscillating in the reverse direction by the abutting of the stopper face 11B of the plunger activating cam 11 of FIG. 5 fixed to the cam shaft 10 against the stopper 13, so that, when the checker roller 9A is pushed by the roller R of the chain 2, only the ducking arm 9B swings against the force of the compression spring 9G clockwise around the pivot pin 9C, thereby letting the roller R pass.

If the oscillation angle of the ducking arm 9B is small after disengagement of the roller R from the checker roller 9A, the force of the compression spring 9G returns the ducking arm 9B to the extended position via the spring plunger 9F. However, if the oscillation angle of the ducking arm 9B is large due to a high reverse travel speed of the chain 2 or a large amount of interference between the roller R and the checker roller 9A, the lower end face of the spring plunger 9F moves over the base end upper face of the ducking arm 9B to the end face side in the rear, thereby holding the ducking arm 9B by the force of the compression spring 9G in the lateral attitude relative to the reverse travel direction of the chain 2.

The above-mentioned novel constitution reduces the wear of the pivot pin 9C and the spring plunger 9F due to the oscillation of the ducking arm 9B in the reverse travel of the chain 2. It should be noted that if the ducking arm 9B is left lateral in attitude, the ducking arm 9B may be manually returned to the extended position after the reverse travel of the chain 2.

In the present embodiment, the cam shaft 10 is inserted in a cam shaft hole 9J formed on the base end side of the arm main body 9D of the checker arm 9. The checker arm 9 is fixed to the cam shaft 10 by inserting the tip of an index pin 9H in one of many index holes 10A, 10B formed in the cam shaft 10.

To be more specific, the index pin 9H goes through a hole 9I formed in the arm main body 9D by intersecting the cam shaft hole 9J into the cam shaft hole 9 in a manner that the tip of the index pin 9H can go in or out of the cam shaft hole 9.

The above-mentioned hole 9I allows the cam shaft hole 9J to communicate with the outer surface of the base end portion of the arm main body 9D, an internal thread being formed in the vicinity of the opening of the outer surface of the base end portion. A spring holding plug 9K, formed at the center thereof with a hole through which the index pin 9H goes, is mated with the internal thread. The spring holding plug 9K holds a compression spring 9L which presses the tip of the index pin 9H into the hole 9I.

The index pin is provided with an operator knob 9M. Manually pulling the operator knob 9M can take the tip of the index pin 9H out of the index hole 10A, 10B provided in the cam shaft 10.

In this state, when the position of the checker arm 9 is moved relative to the cam shaft 10, the tip of the index pin 9H is mated in one of the index holes 10A, 10B, and then the operator knob 9M is released, the tip of the index pin 9H is mated into another index hole by the force of the compression spring 9L, thereby fixing the checker arm 9 at another corresponding position.

These index holes 10A and 10B are arranged at positions 90 degrees apart from each other in the radial direction in one cross section and at right angles to the axis of the cam shaft 10 as shown in FIG. 7. At the same time, as shown in FIGS. 2 and 3, these index holes are formed equidistantly along the axis of the cam shaft 10.

FIG. 8 is a diagram illustrating a state in which the tip of the index pin 9H has been inserted in the index hole 10B and the checker arm 9 is laterally fixed as compared to the position shown in FIG. 7. When no lubrication is performed on the chain 2, the checker arm 9 is held in the position shown in FIG. 7 to prevent the checker roller 9A from interfering with the roller of the chain 2.

When the checker arm 9 is installed in the position shown in FIG. 8, the chain that is traveling down in the vertical direction, although not shown, can be lubricated. In this case, the position of the lubricating apparatus 1 may be held without change, so that there is no need to separately provide a bleeder or similar which are required when the pump unit 4 is rotated by 90 degrees.

In the present embodiment, according to the size of the chain 2 used and the installation position of the base 3A, the index pin 9H can be moved to the optimum index hole 10A or 10B arranged along the axis of the cam shaft 10.

It should be noted that the number of index holes and the positions of the index holes formed in the cam shaft may be selected appropriately to apply the lubricating apparatus to a chain that is driven in the diagonal direction.

In the above-mentioned embodiment, the checker arm is composed of the arm main body and the ducking arm provided with the checker roller. It will be apparent that, if the chain is driven only in one direction and therefore cannot be driven in the reverse direction, the checker arm may be a single-unit part.

The above-mentioned embodiment is applicable to not only a roller chain, but also a bushed chain. In the case of a roller chain especially, the checker roller may be omitted and the tip of the checker arm may be directly engaged with the roller of the chain.

Further, if the lubricating apparatus 1 according to the present invention is applied to a chain that is driven bi-directionally, the checker arm having the ducking arm may be used and, at the same time, a pair of lubricating apparatuses 1, set to the opposite chain drive directions, respectively, may be used.

In this case, it is required that the ducking arm is surely returned to the extended position, if the swivel angle of the ducking arm at reverse travel is large, when the chain travels forward after traveling backward, by either optimizing the shape of the contact portion between the lower end face of the spring plunger 9F and the upper face of the base end of the ducking arm shown in FIG. 7 or a torsion coil spring is loaded around the pivot pin 9C instead of the compression spring 9G.

Still further, in the present embodiment, the plunger activating cam causes the plunger of the pump unit 4 to discharge lubricant via the cam follower. It will be apparent that, in order to reduce the size of the lubricating apparatus 1 still further, the cam follower may be integrated with the plunger and the cam face of the plunger activating cam may be directly abutted against the lower end of the plunger.

As mentioned above and according to the present invention, when the checker arm is returned to its original position by a forming means upon disengagement from the chain roller or bushing, the flat cam face formed at a position deviated radially from the center of the cam axis of the plunger activating cam, the cam face normally being at approximately right angles to the cam axis, pushes the cam follower moving integrally with the plunger of the pump unit to make the plunger of the pump unit perform a discharge operation. Consequently, lubricant can be instantly applied to the chain at a checker arm oscillation angle as small as 15 to 30 degrees, thereby making the lubricating apparatus according to the invention applicable to both a small-size chain having a narrow roller pitch and a chain traveling at high speeds.

In addition, the lubricant can be jetted from the lubricating nozzle to the chain so fast that the lubricant is applied to the chain in the form of mist, resulting in efficient chain lubrication with a small amount of lubricant. Consequently, the lubricating apparatus according to the invention can reduce lubricant consumption.

According to the present invention, in addition to the above-mentioned effect, the construction in which only the ducking arm swings with the cam axis stopped at chain reverse travel eliminates the necessity for a clutch mechanism for disconnecting the interlocking between the cam shaft and the plunger of the pump unit at chain reverse travel, resulting in the reduced weight and the simplified construction of the lubricating apparatus that eventually leads to lowered manufacturing cost.

According to the present invention, the installation position of the checker arm relative to the cam shaft can be altered with ease.

Especially, according to the present invention, the lubricating apparatus can be applied to chains traveling at a variety of angles with the installation position of the lubricating apparatus being held horizontal. This novel constitution makes it unnecessary to change the installation of bleeder pipes that are provided for oil-bus lubricating parts in the apparatus, thereby facilitating the job of installing the lubricating apparatus.

According to the present invention, the checker arm engagement position can be easily adjusted so that the checker arm is engaged at a proper position in the width direction of the chain according to the size thereof.

What is claimed is:

1. A checker-arm chain lubricating apparatus for lubricating a chain running along a travel path, comprising:

a main body case fixedly placed in a vicinity of the travel path of the chain;

a cam shaft swingably supported on said main body case, wherein said cam shaft has an axis intersecting a direction in which the chain travels, said cam shaft having a protruding portion protruding outside said main body case;

a checker arm fixed at a base end thereof on said protruding portion, wherein a tip end of said checker arm is engaged with the chain as the chain travels along the travel path so that said checker arm is oscillated about an axis of said cam shaft between an engagement start position and a disengagement position;

a return spring for returning said checker arm to said engagement start position when said tip end of said checker arm is disengaged from the chain at said disengagement position;

a plunger activating cam fixed to said cam shaft, wherein said plunger activating cam has a planar cam face which is normally at substantially right angles to said axis of said cam shaft;

a cam follower slidably supported on said main body case in a direction at substantially right angles to said axis of said cam shaft and abutted against said cam face;

a pump unit arranged on said main body case and having a plunger sliding integrally with said cam follower in order to discharge a lubricant toward the chain from a lubricating nozzle communicating with a discharge port when said plunger moves in a forward direction and to take in said lubricant from an oil tank communicating with an intake port when said plunger moves in a backward direction; and wherein when said checker arm is angularly moved from said engagement start position toward said disengagement position, said plunder activating cam turns to cause said cam face to move said cam follower and said plunger in said forward direction, and when said checker arm is returned from said disengagement position to said engagement start position by said return spring, said plunder activating cam turns to cause said cam face to move said cam follower and said plunger in said backward direction.

2. The checker-arm chain lubricating apparatus as claimed in claim 1, wherein said checker arm is composed of an arm main body fixed to said cam shaft and a ducking arm swingably supported at a base end thereof on a tip end of said arm main body and having a checker roller at a tip end of said ducking arm, said checker roller being engaged with said chain, said ducking arm being swingable only in a direction opposite said direction said chain normally travels from an extended position in a direction extending to said tip end of said arm main body and, simultaneously, being held at said extended position by a force of a spring to oscillate against said force of said spring when said chain travels in a direction opposite to said direction said chain normally travels to clear an engagement between said chain and said checker roller.

3. The checker-arm chain lubricating apparatus as claimed in either claim 1 or claim 2, wherein a cam shaft hole is formed in said base end of said checker-arm for allowing said cam shaft to be inserted through said same shaft hole and said checker-arm including an index pin having a tip end which can go in and out of said cam shaft hole and which can be operated from outside said checker arm and a spring for forcing said index pin in a protruding direction, said cam shaft being formed on a circumferential surface thereof with a plurality of index holes in which said tip end of each index pin of said plurality of said index pins is selectively inserted for fixing a position of said checker-arm.

4. The checker-arm chain lubricating apparatus as claimed in claim 3, wherein said plurality of index holes are formed in said cam shaft along and spaced from each other in the circumferential direction of said cam shaft.

5. The checker-arm chain lubricating apparatus as claimed in claim 3, wherein said plurality of index holes are formed in said cam shaft along said axis thereof.

6. The checker-arm chain lubricating apparatus as claimed in claim 4, wherein said plurality of index holes are formed in said cam shaft along said axis thereof.

* * * * *